United States Patent [19]

Nakata et al.

[11] Patent Number: 4,903,789

[45] Date of Patent: Feb. 27, 1990

[54] POWER STEERING APPARATUS

[75] Inventors: Masaru Nakata; Yuji Tomiyama, both of Sakai, Japan

[73] Assignee: Kubota, Ltd., Osaka, Japan

[21] Appl. No.: 180,877

[22] Filed: Apr. 13, 1988

[30] Foreign Application Priority Data

Apr. 13, 1987 [JP] Japan .................................. 62-91672
Apr. 13, 1987 [JP] Japan .................................. 62-91673

[51] Int. Cl.[4] .......................... B62D 5/10; B62D 7/16
[52] U.S. Cl. .................................... 180/155; 180/159; 280/95.1
[58] Field of Search ........ 180/153, 154, 155, 156–158, 180/136, 137, 144, 145, 150, 159, 161–163, 132; 280/95 R, 95 A, 111; 403/53, 54, 56, 57, 76

[56] References Cited

U.S. PATENT DOCUMENTS

| | | | |
|---|---|---|---|
| 1,806,136 | 5/1931 | Weiss | 180/161 |
| 3,398,808 | 8/1968 | Heckenhauer | 280/95.1 X |
| 3,768,585 | 10/1973 | Matteo | 180/154 |
| 3,782,491 | 1/1974 | Herbenar | 280/95 R |
| 4,046,218 | 9/1977 | Blaisdell | 180/155 |
| 4,064,967 | 12/1977 | Doolittle | 180/155 |
| 4,114,724 | 9/1978 | Doolittle | 180/155 |
| 4,592,440 | 6/1986 | Ujita et al. | 180/155 |
| 4,718,686 | 1/1988 | Dziuba | 180/155 |

FOREIGN PATENT DOCUMENTS

| | | | |
|---|---|---|---|
| 3209057 | 9/1983 | Fed. Rep. of Germany | 180/155 |
| 6071 | 1/1986 | Japan | 180/159 |

Primary Examiner—Mitchell J. Hill
Attorney, Agent, or Firm—Edwin E. Greigg

[57] ABSTRACT

A power steering apparatus comprising steering arms for steering front wheels of a vehicle mounted at opposite ends of an axle, and a power cylinder extending parallel to the axle for driving the steering arms. The axle is oscillatably supported by an axle frame through a center shaft. The power cylinder is connected to the axle by a connecting device to be movable in three-dimensional directions. The connecting device includes a support shaft extending parrallel to the axle, an oscillatable arm connected to the support shaft, and a universal joint for interconnecting the oscillatable member and the cylinder. The universal joint has an axis extending perpendicular to the center axis.

4 Claims, 4 Drawing Sheets

POWER STEERING APPARATUS

BACKGROUND OF THE INVENTION

(1) Field of the Invention

The present invention relates to a power steering apparatus for a wheeled vehicle, and particularly for an agricultural tractor.

(2) Description of the Prior Art

As disclosed in U.S. Pat. No. 4,592,440, for example, a power steering apparatus for a tractor comprises an axle oscillatably supported by an axle frame through a center shaft, steerable wheels attached to opposite ends of the axle through kingpins, and a power cylinder including a cylinder tube extending parallel to the axle. The power cylinder includes piston rods each connected to a steering arm through a turn buckle acting as a tie rod.

In the above known construction, however, the tie rod having two joints is connected to each piston rod at an extreme end of the power cylinder. Such tie rods are formed short since a long distance is taken up transversely of the tractor from the extreme end of one of the piston rod and to extreme end of the other piston rod. This allows only a small distance for tread adjustment.

Since the tube of the power cylinder extends parallel to the axle and the steering arms oscillate in three-dimensional directions, the tie rods each having two joints must be used for the connecting purposes in order to absorb such oscillations.

With the above construction, there is a limitation to reduction of the tread because the power cylinder and the tie rods at least require their accommodating spaces transversely of the tractor. There is a further disadvantage in that a loss will occur in the transmission of a steering force to the steering arms.

SUMMARY OF THE INVENTION

The object of the present invention is to provide a power steering apparatus including a power cylinder mounted for three dimensional movements about a center axis of the axle, to allow a large steering angle even at times of a reduced tread.

In order to achieve the above object, a power steering apparatus comprises an axle for supporting steerable wheels at opposite ends thereof, the axle being oscillatably supported by an axle frame through a center shaft, steering arms for steering the steerable wheels, respectively, a power cylinder extending substantially parallel to the axle, the power cylinder including piston rod means slidably mounted in a cylinder tube and operatively connected to the steering arms at positions on an axial extension thereof, and a connecting device for connecting the cylinder tube of the power cylinder to the axle to be movable in three-dimensional directions, the connecting device including a support shaft extending parallel to the axle, an oscillatable member connected to the support shaft, and a universal joint for interconnecting the oscillatable member and the cylinder tube, the universal joint having an axis extending perpendicular to the center axis.

According to the above construction, when a steering wheel is turned, a control valve is switched to apply a hydraulic pressure to the cylinder tube of the power cylinder to cause the piston rod means to slide and transmit a steering force to the steering arms. Then the steering arms are pivoted on kingpins to turn the steerable wheels. At this time, the steering arms make three-dimensional movements about the kingpins, as shown by arrow D in FIGS. 3 and 4. The cylinder tube is allowed to make three-dimensional movements smoothly following the steering arms since the tube is attached to the axle by the connecting device as noted above. Specifically, this connecting device includes an oscillatable member having a support shaft extending parallel to axes of the wheels, and a universal joint having an axis extending perpendicular to the center axis. Further, in this construction, transmission of the steering force from the piston rod means to the steering arms is effected directly through joints therebetween. Consequently, the construction according to the present invention completely eliminates the transmission loss inevitably occurring and the problem of twisting between the piston rods and steering arms in the known construction.

Besides, the present construction dispenses with the space to a significant extent which was required in the prior art for the tie rods having a pair of joints. This allows the tread of the vehicle to be reduced while maintaining a large steering angle as in the prior art. Conversely, where the tread is kept large, a large stroke may be allowed for the piston rods thereby to realize an increased steering angle. The absence of steering force loss and twisting of the components permits the cylinder tube to be reduced in size to impart the same force. This feature provides the advantage of allowing the cylinder tube to be mounted in a narrow space and yet perform a satisfactory power transmitting function.

In a preferred working mode of the present invention, each piston rod has a hollow construction defining an axial bore for receiving a connecting rod. The piston rod is connected to the corresponding steering arm through the connecting rod. This arrangment allows the tread adjustment to be effected by adjusting an amount of the connecting rod lying inside the axial bore of the piston rod, i.e. an amount of extension and contraction.

As described above, the present invention provides an increased range for selecting distances between the piston rod and steering arm, and allows the length of each connecting rod to be changed freely, when a small tread and a large steering angle are desired. This power steering apparatus is believed effective for rendering the vehicle very convenient in practical use.

Other features and advantages of the invention will be apparent from the following description.

DESCRIPTION OF THE PREFERRED EMBODIMENT

An embodiment of the present invention will be described in detail hereinafter with reference to the drawings.

Figure 1:
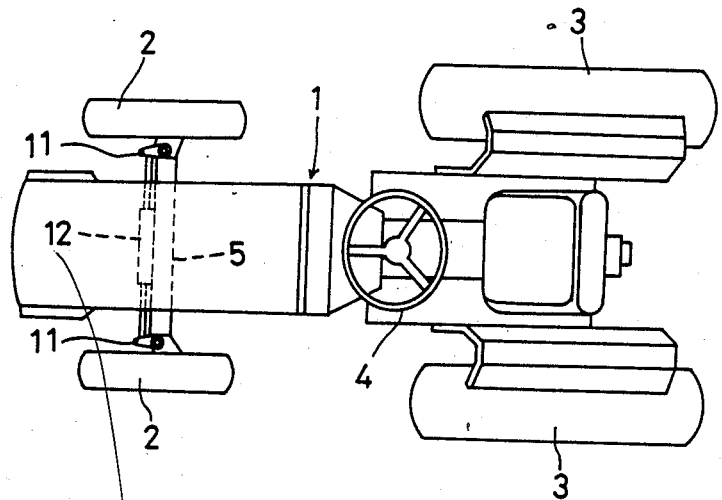
FIG. 1 is a plan view of a tractor.

FIG. 1 shows a two-axle four-wheel tractor 1 which comprises a pair of right and left front wheels 2 and a pair of right and left rear wheels 3. The front wheels 2 are steerable wheels. Number 4 indicates a steering wheel which switches a hydraulic control valve not shown. The front wheels 2 are attached to opposite ends of an axle 5 to be pivotable about kingpins.

The front wheels 2 may be drive wheels in addition to being steerable. Where the front wheels 2 are drive wheels, the axle 5 contains a differential mechanism and includes bevel gears mounted at the opposite ends of the axle 5 for operative connection to the differential mechanism.

Figure 2:
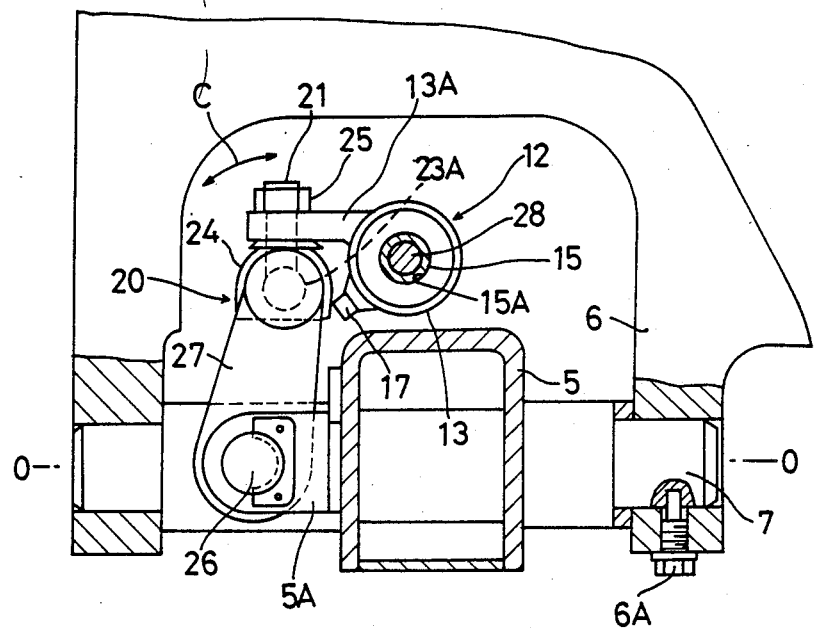
FIG. 2 is a sectional side view of an axle frame.

Referring to FIG. 2, an axle frame 6 supports a center shaft 7 having an axis extending longitudinally of the tractor 1. The axle 5 is attached to the center shaft 7 acting a center pivot for allowing oscillations of the axle 5.

The axle 5 has a telescopic construction comprising a box-shaped shaft portion 8 and opposite end shaft portions 9 inserted in the box-shaped shaft portion 8 to be slidable and fixable by bolts 10 or the like. Each of the end shaft portions 9 includes a bend 9A at an extreme end thereof which is turned rearwardly in plan view. The bend 9A supports the steerable wheel 2 through the kingpin, and includes a steering arm 11 extending forwardly.

Reference 12 indicates a power cylinder comprising a cylinder tube 13, a piston 14 fitted in the cylinder tube 13, and a pair of left and right piston rods 15 and 16. The cylinder tube 13 is in communication with fluid pipes 17 and 18 through which hydraulic pressure is supplied from the control valve. The piston 14 is caused to slide by the hydraulic pressure, thereby to drive the piston rods 15 and 16.

The illustrated example is the double-acting type with the piston rods 15 and 16 connected at extreme ends thereof to the corresponding steering arms 11 through couplings 19. Alternatively, the cylinder may comprise a single piston rod connected to the steering arms 11 which in turn are connected to each other by a coupling element.

The tube 13 of cylinder 12 extends substantially parallel to the axis of the axle 5 and is connected to the axle 5 by a connecting device 20 to be oscillatable in three-dimensional directions.

Figure 5:
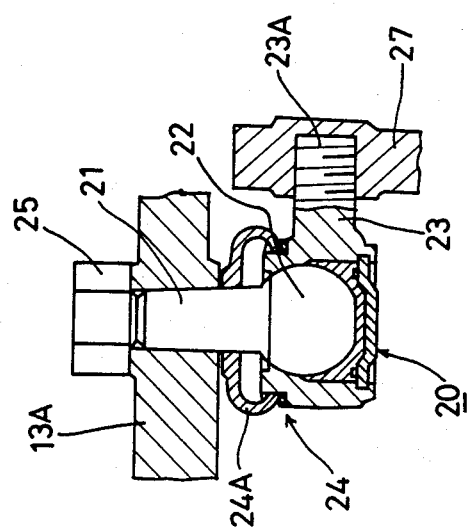
FIG. 5 is a sectional view of the axle frame.

As shown in FIG. 5, the connecting device 20 comprises a ball 22 provided at an end of a support shaft 21, and an oscillatable ball 24 having a ball socket 23 in which the ball 22 is fitted. The support shaft 21 extends through and is secured, by a nut 25 to a second bracket 13A projecting from the tube 13. The axle 5 has a first bracket 5A projecting forwardly therefrom and supporting a support shaft 26 extending substantially parallel to the axle 5 and rotatably received in the bracket 5A. The support shaft 26 is connected to an arm 27, and a shaft 23A of ball socket 23 is fixed to an upper end of the arm 27.

That is to say, the tube 13 is attached to the axle 5 by the connecting device 20 including the ball joint 24 on a vertical plane X—X through the center of the center shaft 7 and the support shaft 26 on a horizontal plane Y—Y of the center shaft 7.

Figure 3:
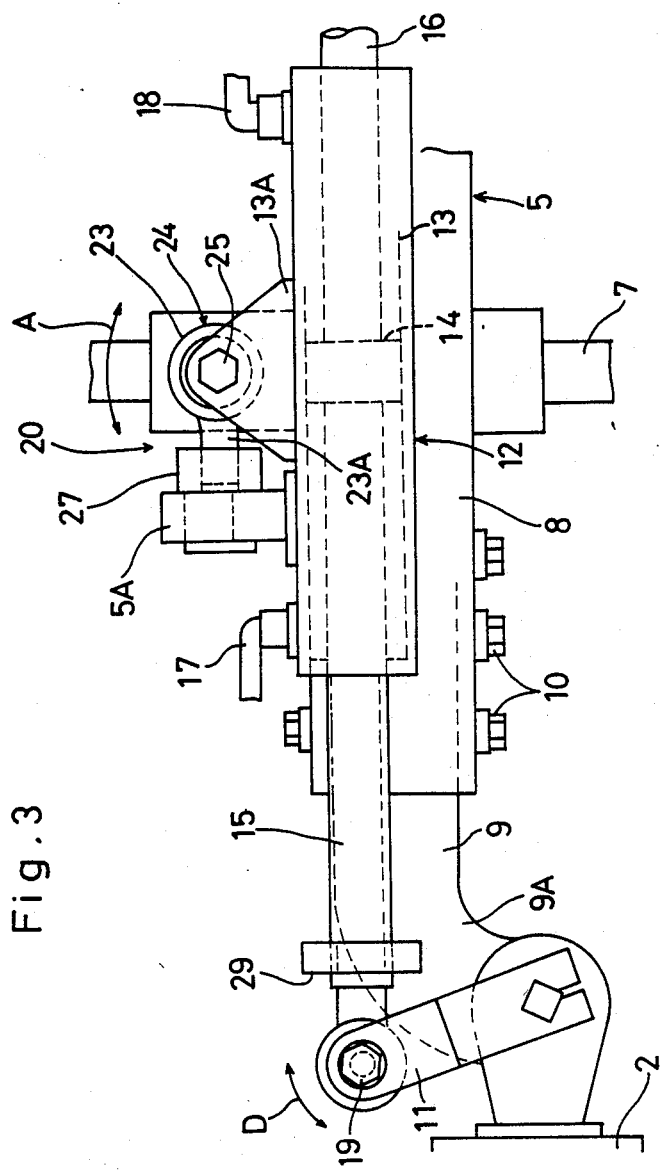
FIG. 3 is a plan view of the axle frame.
Figure 4:
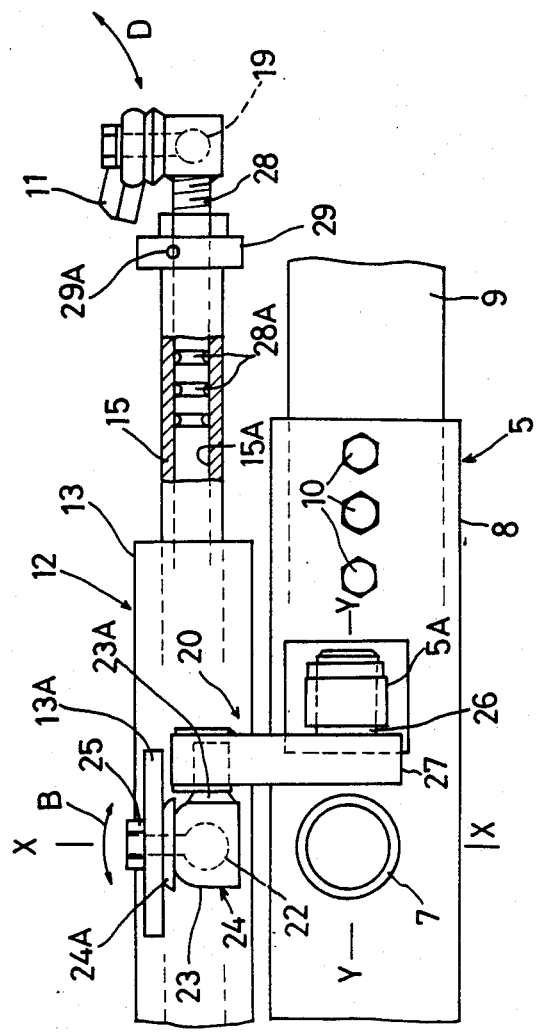
FIG. 4 is a front view of the axle frame.

This construction permits the power cylinder 12, though immovable axially of the axle 5, to oscillate about the ball joint 24 in directions of arrow A in FIG. 3 and of arrow B in FIG. 4 and about the support shaft 26 in directions of arrow C in FIG. 2. Thus the power cylinder 12 is capable of movements in three-dimensional directions following the oscillations of the steering arms 11.

Each of the piston rods 15 and 16 is connected by the coupling 19 to the end of the steering arm 11 located on the axis of the piston rod. In this embodiment, the coupling 19 forms part of a connecting rod 28 connected to the piston rod 15 or 16 by a clamp 29. Each piston rod 15 or 16 defines an axial bore 15A, and the connecting rod 28 is slidable received in the bore 15A and secured therein by the clamp 29.

Figure 6:
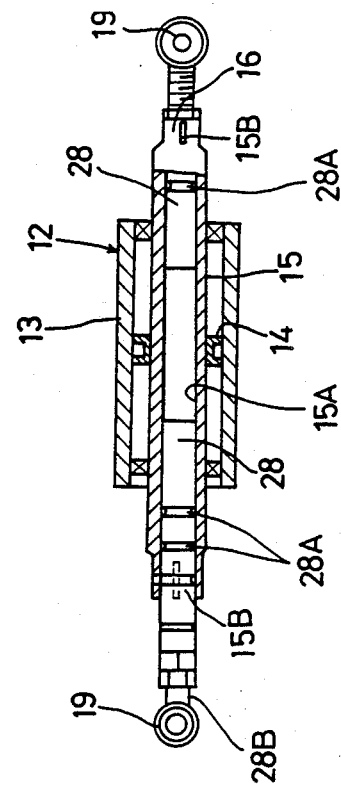
FIG. 6 is a sectional view, partly broken away, of a power cylinder.

As shown in FIG. 6, the connecting rod 28 defines cutouts 28A on outer peripheries thereof at axially spaced-apart positions. The clamp 29 includes a lock pin 29A engageable with the cutouts 28A to fix the connecting rod 28 to the piston rod 15 or 16. Each piston rod 15 or 16 defines a slit 15B at an open end thereof continuous with the axial bore 15A to allow the clamp 29 to perform a strong fastening function.

In the illustrated example the cylinder tube 13 is disposed above the axle 5, but may be disposed below the axle 5. Further, the support shaft 26 is connected to one arm 27, but two arms 27 may be provided opposite each other across the center shaft 7 and attached to the axle 5 through support shafts 26 so as to support the ball joint 24 at two opposite positions. In the drawings, reference 24A indicates an elastic boot, and reference 6A indicates a center shaft stopper.

What is claimed is:

1. A power steering apparatus comprising:
   an axle (5) for supporting steerable wheels (2) at opposite ends thereof, said axle being oscillatably supported by an axle frame (6) through a center shaft (7) having an axis extending longitudinally of a vehicle body in a substantially middle portion thereof,
   steering arms (11) for steering said steerable wheels, respectively,
   a power cylinder (12) extending substantially parallel to said axle, said power cylinder including piston rod means (15, 16) slidably mounted in a cylinder tube (13) and operatively connected to said steering arms at a position in a substantially longitudinal axis, and
   a connecting device (20) for connecting said cylinder tube of said power cylinder to said axle to be movable in three-dimensional directions, said connecting device including
   an oscillatable member (27) having a support shaft (26) at a base end thereof extending substantially parallel to said axle and pivotally supported by a first bracket (5A) connected to and projecting from said axle (5), said oscillatable member being movable in a plane perpendicular to said axle, and
   universal joint means (24) for interconnecting said oscillatable member and a second bracket (13A) extending from said cylinder tube, said universal joint means for interconnecting said second bracket has an axis extending perpendicular to an axis of said center shaft to permit omnidirectional pivotal movements of said cylinder.

2. A power steering apparatus as claimed in claim 1 wherein each of said piston rod means of said power cylinder has a hollow construction for slidably and fixably receiving a rod operatively connected to each of said steering arms.

3. A power steering apparatus as claimed in claim 1 wherein said universal joint means is a ball joint.

4. A power steering apparatus as claimed in claim 1 wherein said universal joint means is disposed substantially on a higher horizontal plane than said center shaft and oscillates about a vertical plane X—X through a center of said center shaft.

* * * * *